United States Patent Office 3,595,898
Patented July 27, 1971

---

3,595,898
PERESTERS BY REACTION OF CARBOXYLIC ACIDS WITH ORGANIC HYDROPEROXIDES
Robert Joseph Harvey and Charles Nathan Winnick, Teaneck, N.J., assignors to Halcon International, Inc.
No Drawing. Filed Mar. 11, 1968, Ser. No. 711,860
Int. Cl. C07c *69/00*
U.S. Cl. 260—453         10 Claims

ABSTRACT OF THE DISCLOSURE

This invention relates to a process for the manufacture of peresters and more particularly to such a process wherein the peresters are prepared by reaction between an organic hydroperoxide and a carboxylic acid. In particularly preferred embodiments, this invention relates to processes for the manufacture of tertiary alkyl peresters and to secondary and tertiary aralkyl peresters. Thus, this invention is especially applicable to the manufacture of such peresters as, for example, t-butyl peracetate, t-butyl perbenzoate, ethylbenzyl perpivalate and cumyl perisobutyrate.

THE BACKGROUND OF THE INVENTION

Peresters are valuable articles of commerce being useful as, for example, polymerization catalysts. Heretofore, peresters have been manufactured primarily by reactions between hydroperoxides and acid halides or acid anhydrides. Such prior art methods are of somewhat restricted utility because of the limited number of acid halides and acid anhydrides that are commercially available. Moreover, the prior art methods have required the presence of very substantial amounts of alkaline materials to obtain the desired products—usually of the order of 1 mole of basic material per mole of acid chloride or acid anhydride. Especially when acid anhydride reactants were used, the presence of this basic material has caused very substantial yield losses through salt formation. Also, these prior art reactions are highly exothermic resulting in substantial safety hazards unless extensive precautions are taken to control the reaction with great precision thereby increasing the expense of these prior art methods.

The preparation of peresters by the reaction between hydroperoxides and carboxylic acids, a reaction superficially analogous to simple esterification, has also been attempted. With the sole exception of the tertiary alkyd performates, such prior art methods have been characterized by extremely low yields (see German Pat. No. 1,235,286). Accordingly, it has not heretofore been deemed practicable to prepare peresters of acids other than formic acid by this reaction. Surprisingly, however, it has now been found possible to prepare a variety of commercially desired peresters by this reaction in high yields, oftentimes approaching quantitative. The process of the invention is capable of producing desired perester products in high yield in a safe and straightforward manner.

SUMMARY OF THE INVENTION

In accordance with this invention, peresters are prepared by the reaction between the carboxylic acid to be peresterified and an organic hydroperoxide. The products of the reaction are the desired perester product and water. In order to obtain highest yields by this invention, it is necessary to remove the water formed in the reaction so as to displace the equilibrium of the reaction and drive it towards completion, i.e., towards maximum formation of perester product although perester is still formed in the absence of water removal.

A catalyst for the reaction is necessary. This catalyst is a strong acid and is employed in an amount from about 0.001% to about 10% by weight of total reactor charge. Not only is the presence of a catalyst critical for obtaining the high yields, but the amount of catalyst employed is also crtical at least insofar as the upper limit is concerned. If amounts of acid catalysts substantially in excess of 10% by weight of total reactor charge are employed yield of the desired perester product falls off dramatically.

As hereinabove and hereinafter used, the phrase "total reactor charge" refers to the totality of material fed to the reactor, including solvents and inert diluents as well as reactants.

DETAILED DESCRIPTION OF THE INVENTION

According to the process of this invention, peresters are produced by the reaction between a carboxylic acid and an organic hydroperoxide. This reaction takes place in the liquid phase. The following chemical equation, employing tertiary butyl hydroperoxide and acetic acid as illustrative of the reactants suitable for the practice of this invention, is illustrative of the overall chemistry.

$$(H_3C)_3COOH + H_3C\overset{O}{\underset{\|}{C}}-OH \longrightarrow$$

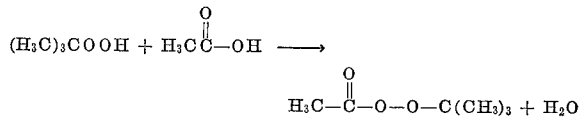

Those carboxylic acids suitable as reactants in the process of this invention are the alkyl carboxylic acids and the aromatic carboxylic acids. Suitable alkyl carboxylic acids are those which contain two or more carbon atoms and are preferably those having from two to ten carbon atoms per molecule. Exemplary of alkyl carboxylic reactants suitable for the process of this invention are such monobasic acids as acetic acid, propionic acid, n- and iso-butyric acids, valeric acid, pivalic acid, the octanoic acids, the decanoic acids, e.g., n-decanoic acid and the like. Di-basic acids such as oxalic, malonic, succinic, maleic and fumaric acids can also be used although generally the use of monobasic acids is preferred. Aryl substituted alkyl carboxylic acids, for example, phenylacetic acid are also suitable and are included within the scope of "alkyl carboxylic acids" as this phase is used herein. The phrase "alkyl carboxylic acids" as used herein also includes acids which have an olefinic double bond within the molecular structure thereof, such as, for example, acrylic acid, methacrylic acid, angelic acid and tiglic acid.

Suitable aromatic carboxylic acid reactants for use in the process of this invention are those which contain less than 20 carbon atoms. Exemplary of such articles are benzoic acid, the o-, m-, and p-alkyl substituted benzoic acids, alpha and beta naphthoic acids, and the like. Di-basic aromatic carboxylic acids such as the phthalic acids can also be used although the use of monobasic acids is preferred. Nuclearly alkyl substituted aromatic carboxylic acid reactants can also be employed, so long as the alkyl substituents contain not more than about 6 carbon atoms.

Particularly prefered carboxylic acid reactants are acetic acid, isobutyric acid, pivalic acid and benzoic acid since the peresters of these acids are the most commonly desired of the perester products of commerce. It is also possible to use mixtures of carboxylic acid reactants but, in such a case, mixtures of perester products are obtained.

Organic hydroperoxide reactants suitable for use in the present invention are those which are stable under the mild conditions employed in the reaction. Such hydroperoxides include the t-alkyl hydroperoxides, the secondary aralkyl hydroperoxides and the tertiary aralkyl hydroperoxides. It is generally preferred to employ organic hydroperoxides containing fewer than 15 carbon atoms per molecule in order to obtain reasonably high reaction rates although this is not necessarily required. Illustrative of the t-alkyl hydroperoxides suitable in the practice of this invention are t-butyl hydroperoxide, t-amyl hydroperoxide (2-methyl-2-butyl hydroperoxide), 2-methyl-2-pentyl hydroperoxide, and 2,2,4-trimethyl-4-pentyl hydroperoxide. With regard to the aralkyl hydroperoxides useful in the practice of this invention, it is normally preferred to use those of these hydroperoxides which are alpha-aralkyl. Exemplary of such particularly preferred aralkyl hydroperoxides suitable in the practice of this invention are alpha-phenylethyl hydroperoxide; cumyl hydroperoxide, alpha- and beta-naphthylethyl hydroperoxides and the like. Of course, mixtures of hydroperoxides can be used if mixtures of perester products are permissible.

In the reaction between the organic hydroperoxide and the carboxylic acid, water is formed. To obtain maximum yields of the desired perester, it is necessary to remove this water as the reaction proceeds in order to displace the equilibrium of the reaction and drive it toward completion, i.e., towards maximum formation of perester. Without water removal, perester is still obtained, albeit in lower yield. Water removal can be readily accomplished by conduct of the reaction under conditions whereby water formed in the reaction is volatilized as the reaction proceeds. Thus, for example, the reaction can be conducted under vacuum (e.g., 0.1 to 200 mm. Hg) and at moderate temperatures (e.g. 0 to 80° C.) whereby the water formed in the reaction is distilled from the reaction medium. To facilitate removal of water in this manner, it is also possible to strip the reacting mass with an inert gas. Suitable stripping gases are those which are non-reactive with the reagents employed under the reaction conditions used. Thus, for example, nitrogen, helium, argon, neon and carbon dioxide are suitable. Also suitable as stripping vapors are the normally vaporous hydrocarbons such as, for example, methane, ethane, and ethylene. Obviously, it is possible to use combinations of the foregoing conditions to assure speedy and close-to-complete water removal.

According to a particularly preferred embodiment of this invention it has been found possible to remove water formed in the reaction by the addition of specific dehydrating agents to the reacting mass before or during the course of the reaction. The dehydrating agents found to be useful in this embodiment of the invention are all boron compounds and specifically are those oxides of boron which are less than fully hydrated. Thus, pyro-boric acid, meta-boric acid and boric oxide ($B_2O_3$) are suitable while ortho-boric acid, the fully hydrated form, is not suitable. According to this preferred embodiment, i.e., employing boron oxide dehydrating agents, the water liberated during the course of the reaction combines with the boron oxide, ultimately fully hydrating it to the ortho-boric acid form. Ortho-boric acid appears to be an inert insofar as the reaction is concerned, neither enhancing nor inhibiting the obtention of the desired perester products. Obviously, the water absorption capacity of the boron oxide dehydrating agent depends upon the form of the boron oxide. Boric oxide ($B_2O_3$) is consequently the most preferred of the three useful boron oxides since one mole thereof is capable of absorbing three moles of water. Amounts of the boron oxide dehydrating agent of as little as 0.1 mole of boron oxide (expressed as $B_2O_3$) per mole of hydroperoxide reactant employed are effective in removing sufficient water to enhance yield. Obviously there is no critical upper limit on the amount of boron oxide that can be so employed; however, it is unnecessary to employ amounts of boron oxide greater than that dictated by the stoichiometry of the reaction (e.g., 1 mole of $B_2O_3$ per 3 moles of hydroperoxide) since little advantage is obtained thereby.

The behavior of boron oxides as dehydrating agents, insofar as is presently known, is apparently unique. Such common and conventional dehydrating agents as the anhydrous alkali metal and alkaline earth metal sulphates and chlorides give results which are but slightly, if any, better than those obtained in runs wherein no steps are taken to remove water liberated during the course of the reaction. The reason for the somewhat unique behavior of the boron oxide is not understood, particularly since it does not appear that the boron oxides enter into the reaction between the hydroperoxide and the carboxylic acid, though such a possibility cannot presently be precluded.

The perester formation reaction requires the presence of a small but catalytically effective amount of strong acid to obtain the desired results. The term "strong acid" refers to those acids which, in dilute water solution (approximately 0.1 N or more dilute), are highly ionized. Thus, acids useful as catalysts in the process of this invention in dilute water solution have a pK (measured at about 15° C. to 25° C.) which is less than about 3.5 and preferably have a pK which is less than about 2. Exemplary of such acids are sulphuric acid, phosphoric acid, perchloric acid, the aryl sulfonic acids, e.g., p-toluene sulfonic acid and the other sulfonic acids of benzene and its homologues, and the like. Since water is a by-product of the perester formation reaction, the addition of substantial amounts of free water to the reaction medium in conjunction with the strong acid catalyst is undesirable; hence, it is desired to use the acid catalyst in concentrated form (e.g., concentration of 70% by weight or more). Thus, while hydrofluoric acid is a suitable catalyst for the reaction of this invention, it is preferred that it not be employed in the form of its aqueous solutions. If used, it is preferably introduced to the reaction medium in its vapor form until a sufficient amount thereof is dissolved in the reaction medium. The preferred strong acid catalysts are those which are available in highly concentrated forms, as liquids, without the presence of substantial amounts of free water; such acids include, for example, sulphuric acid, p-toluene sulfonic acid and perchloric acid. Phosphoric acid, trichloroacetic acid and hydrofluoric acid while useful as catalysts are less preferred. The use of sulfuric acid (approximate pK for the first dissociation=−3.0 at 25° C.) is particularly preferred since it is readily available in highly concentrated form at low cost.

Only a small amount of acid catalyst is required, as little as 0.001% by weight of the total reactor charge being sufficient. Care, however, should be taken to avoid use of quantities of acid catalyst in excess of about 10% by weight of the total reactor charge since, if amounts substantially greater than this are employed, perester yield falls off sharply. It is normally desired to use from about 0.1% to about 10% by weight of the total reactor charge of strong acid catalyst and amounts of acid catalyst between 0.5% and 5% by weight of the total reactor charge are preferred.

The reaction of the carboxylic acid and the organic hydroperoxide to produce the perester is conducted in the liquid phase by admixing the two reactants under suitable conditions. Either batch or continuous operation can be employed. Suitable temperatures are within the range of from about 0° C. to about 100° C. desirably within the range from about 20° C. to about 80° C. and preferably within the range of about 20° C. to about 50° C.

Pressure is not critical so long as it sufficient to maintain the bulk of the reactants in liquid phase while, at the same time, permitting the removal of water. Thus, when the water by-product formed in the reaction is removed by volatilization, pressures ranging from about 0.1 mm. Hg to about 200 mm. Hg can be employed. Pressures above 200 mm. Hg can also be employed even when water is removed by volatilization; however, in such cases, it is preferred to employ stripping gases to ensure water removal at comparatively low temperatures. When using stripping gas, superatmospheric pressures, e.g. 25 p.s.i.g. or even higher, can be employed. If a boron oxide dehydrating agent is used, any pressure sufficient to maintain the reactants in liquid phase can be used.

The reaction can be conducted with or without a solvent although the use of solvents is normally desired. Suitable solvents are those organic materials which are inert under the conditions of the reaction and include the aromatic hydrocarbons, the cycloparaffinic hydrocarbons and the paraffinic hydrocarbons. The only restrictions are that the solvent hydrocarbons be normally liquid under reaction conditions and not form high-boiling azeotropes with water. Oxygenated hydrocarbons, such as, for example, ketones and ethers which are non-reactive under the conditions employed can also be used, as also can mixtures of solvents. Exemplary of satisfactory solvents for use in the practice of this invention are benzene, toluene, the xylenes, cyclohexane, methylcyclohexane, n-heptane, mineral spirits, methylethyl ketone, diethyl ether and the like.

The ratio of organic hydroperoxide to carboxylic acid employed in the reaction of this invention is not particularly critical. However, it is normally preferred to employ a substantial excess of carboxylic acid reacant over that stoichiometrically needed to react with the organic hydroperoxide. This further tends to drive the equilibrium of the reaction towards increased perester yields. Thus, while the molar ratio of carboxylic acid to organic hydroperoxide can be as low as about 0.5:1, it is normally desired to employ ratios which are at least about 1:1 and it is preferred to employ ratios which, depending upon the precise nature of the organic hydroperoxide and the carboxylic acid, are at least about 2:1. Upper limits of the molar ratio of carboxylic acid reactant to organic hydroperoxide are not related to process considerations but are controlled by economic factors wherein acid costs must be balanced against increased perester yield. Of course, it is possible to recover excess acid for recycle and reuse but this too is costly.) Thus, while possible to operate with molar ratios of acid to hydroperoxide of 20:1 or higher, it is normally more practicable to employ ratios which do not exceed about 10:1 and it is preferred to employ molar ratios of carboxylic acid to organic hydroperoxide of about 5:1 or less.

Suitable reaction times for the conduct of the process of this invention vary depending upon the precise reactants employed but, generally, reaction times between about 15 minutes and about 10 hours are suitable. Employing the preferred reactants, discussed above, in conjunction with suitable catalysts and solvents, reaction times will generally be in the range of about 30 minutes to about 5 hours.

After completion of the reaction, the perester produced may be recovered in a variety of ways. Where a dehydrating agent is employed, the first step in the recovery procedure is normally to remove it in whatever form it may then be, i.e., whether in dehydrated or hydrated form. This can be accomplished by decantation, filtration or centrifugation or by any combination thereof. The perester product can then be refined by washing it with water and/or aqueous alkaline materials, e.g., alkali or alkaline earth metal carbonates, bicarbonates, hydroxides, etc., to remove any residual acid catalyst, unreacted carboxylic acid and hydroperoxide present. The resulting product is then in a form of a solution of the desired perester product in whatever solvent was employed in the reaction. For many purposes this solution will be sufficient for use without further processing. However, if a more concentrated product is desired, residual solvent may be removed by conventional means known to those skilled in the art, e.g., by vacuum distillation.

EXAMPLES:

The following examples are presented to further illustrate this invention but are not intended as limiting the scope thereof. Unless otherwise stated, all parts and percents in the following examples are by weight. Selectivity and yield values are expressed on a molar basis.

Example I

To a reaction system comprising a reaction vessel in conjunction with a 20 plate Oldershaw-type distillation column are charged 30 parts of t-butyl hydroperoxide and 170 parts of acetic acid, corresponding to a molar ratio of acetic acid to hydroperoxide of 8.5:1. To this admixture of hydroperoxide and carboxylic acid are added 0.2 part of 98% sulphuric acid corresponding to 0.1% by weight of sulfuric acid based on the total reactor charge. After these materials are charged, the pressure in the reaction vessel is reduced to 30 mm. Hg, and the reactor contents are heated to 50° C. Vapors generated as the reaction proceeds are fed to the distillation column. The overhead vapor from the distillation column is a mixture of acetic acid and water. The reflux ratio employed is 20:1 (reflux ratio being defined for present purposes as moles of reflux per mole of net overhead product). After four hours, heating is discontinued and the reactor contents are analyzed. It is found that substantially all of the hydroperoxide is converted and the molar yield of t-butyl peracetate, based on hydroperoxide, is 85%.

Example II

Example I is repeated except that the amount of acetic acid charged is reduced from 170 parts to 30 parts, corresponding to a reduction in the ratio of acetic acid to t-butyl hydroperoxide from 8.5:1 to 1.5:1. Benzene is used as a diluent in this system. Hydroperoxide conversion remains substantially 100% while molar selectivity to t-butyl peracetate, based on hydroperoxide converted, is 75%.

Example III

To a reaction vessel are charged 9 parts of acetic acid and 8.03 parts of a solution of t-butyl hydroperoxide in benzene (84% peroxide). Also added to the reaction vessel are 0.16 parts of 98% sulphuric acid corresponding to approximately 1% by weight of sulphuric acid based on total reactor charge. The reaction vessel is allowed to stand for 18 hours at room temperature during which time no steps are taken to remove water liberated in the reaction. At the end of this time, this reaction vessel is opened and the contents thereof are analyzed. Hydroperoxide conversion is 47% and selectivity, based on hydroperoxide converted, is 94%. This corresponds to a yield of perester based upon hydroperoxide of 44%. This example, in contrast to the results of Example II, demonstrates the effect of removing water formed during the reaction upon yield.

Control A.—The procedure of Example III is repeated except that the amount of sulphuric acid is increased from 1% by weight to 11% by weight of the total reactor charge. Analysis indicates that conversion of the hydroperoxide has increased to 92% while the selectivity to t-buyl peracetate has fallen to only 48%. Thus the overall yield of perester based an hydroperoxide charged is only 44%. The results of this control illustrate the importance of limiting the amount of acid catalyst charged, since, here, hydroperoxide is destroyed without obtaining the desired perester product.

Example IV

The procedure of Example I is repeated in a series of runs employing a variety of strong acid catalysts at varying concentrations. The results of these runs are presented in Table I which follows. All runs in Table I are carried out employing the apparatus, reagents, concentrations and conditions of Example I except for catalyst and catalyst concentration. Catalyst concentration in Table I refer to weight percent of acid charged (on a water-free basis) based on total charge. "Selectivity" as used therein refers to moles of t-butyl peracetate formed per mole of hydroperoxide reacting.

TABLE I

| Run No. | Catalyst | Wt. percent catalyst | Percent Hydroperoxide conversion | Percent Selectivity to t-butyl peracetate |
|---|---|---|---|---|
| 1 | H₂SO₄ (98%) | 0.01 | 94 | 90 |
| 2 | Same as above | 0.1 | 100 | 85 |
| 3 | do | 2.0 | 100 | 78 |
| 4 | do | 5.0 | 100 | 65 |
| 5 | do | 7.0 | 100 | 50 |
| 6 | do | 10.0 | 100 | 10 |
| 7 | H₃PO₄ (85%) | 1.0 | 58 | 86 |
| 8 | p-Toluene sulfonic | 3.0 | 80 | 94 |
| 9 | HF | 2.0 | 73 | 82 |
| 10 | H₂SO₄ (70%) | 1.0 | 100 | 85 |
| 11 | H₂SO₄ (50%) | 1.0 | 100 | 82 |
| 12 | H₃PO₄ | 3.0 | 75 | 82 |
| 13 | HClO₄ | 2.0 | 100 | 89 |

The data of Table I demonstrate the importance of maintaining the strong acid catalyst level below about 10% by weight of the total reactor charge since above about this level, selectivity to the peracetate falls sharply despite continued high hydroperoxide conversion. Similarly, the data of Table I also demonstrate that the nature of the strong acid catalyst can be varied widely and can be added at a variety of concentrations without affecting yield.

Example V

The procedure of Example I is repeated employing 51 parts of pivalic acid and 150 parts of a solution of t-butyl hydroperoxide in benzene (15% hydroperoxide), corresponding to a molar ratio of acid to hydroperoxide of 2:1. Sulfuric acid (98%) is used as the catalyst in an amount equivalent to 1.0 wt. percent based on total reactor charge. Reactor temperature is 40° C., reactor pressure is 75 mm. Hg and reaction time is 5 hours. Analysis indicates a conversion of hydroperoxide of approximately 100% and a selectivity to t-butyl perpivalate which is approximately 80%.

Example VI

A series of runs similar to that of Example V are carried out employing a variety of carboxylic acids. Reaction times, temperatures, pressures, reactant molar ratios and catalyst nature and concentration are as stated in Example V. The following table presents the results obtained.

TABLE II

| Run No. | Carboxylic acid | Percent Conversion | Percent Selectivity to perester |
|---|---|---|---|
| 1 | Propionic acid | 95 | 88 |
| 2 | n-Butyric acid | 92 | 87 |
| 3 | Isobutyric acid | 96 | 85 |
| 4 | n-Valeric acid | 88 | 83 |
| 5 | 3-methylbutanoic acid | 91 | 82 |
| 6 | n-Octanoic acid | 85 | 73 |
| 7 | n-Decanoic acid | 87 | 70 |
| 8 | Phenylacetic acid | 93 | 76 |
| 9 | 2-phenylpropionic acid | 96 | 82 |
| 10 | Angelic acid | 94 | 86 |
| 11 | Benzoic acid | 97 | 95 |
| 12 | p-Isopropylbenzoic acid | 92 | 89 |
| 13 | n-Amylbenzoic acid | 86 | 85 |
| 14 | Alpha-naphthoic acid | 95 | 92 |
| 15 | Beta-naphthoic acid | 98 | 89 |
| 16 | 2,4,5-trimethylbenzoic acid | 92 | 84 |

It is thus seen from Table II that a wide variety of carboxylic acids can be used in the process of this invention.

Example VII

A series of runs are carried out in accordance with the procedure in Example I employing acetic acid and varying organic hydroperoxides. In these runs, reactant molar ratios, times, temperatures, pressures and catalysts are as stated in Example V. The following table presents the results of these runs.

TABLE III

| Run No. | Organic hydroperoxide | Percent Conversion | Percent Selectivity to perester |
|---|---|---|---|
| 1 | t-Amyl | 96 | 88 |
| 2 | 2-methyl-2-pentyl | 97 | 83 |
| 3 | 3-ethyl-3-pentyl | 96 | 86 |
| 4 | 2,2,4-trimethyl-4-pentyl | 92 | 90 |
| 5 | Alpha-phenylethyl | 93 | 65 |
| 6 | Alpha-naphthylethyl | 95 | 70 |
| 7 | Beta-naphthylethyl | 92 | 72 |
| 8 | Cumyl | 96 | 93 |

Example VIII

The runs described in Table IV are carried out to illustrate the embodiment of this invention wherein the water by-product liberated during the reaction is removed by means of a dehydrating agent. These runs are carried out by adding t-butyl hydroperoxide, acetic acid, strong acid catalyst and boric oxide (B₂O₃) to a reaction vessel; maintaining the reaction vessel and its contents at the temperatures indicated in Table IV for the times indicated therein and then analyzing the contents of the reaction vessel to determine hydroperoxide conversion and the selectivity to t-butyl peracetate based on hydroperoxide converted. The t-butyl hydroperoxide employed in these runs is in the form of a 38.4 weight percent solution of the hydroperoxide in benzene. All runs in Table IV, except Controls B and C, employ 98% sulfuric acid as catalyst in an amount sufficient to provide 1.0 weight percent of catalyst based on total reactor charge. No catalyst is used in Controls B and C. The abbreviation "HP" used in the headings of Table IV means hydroperoxide.

TABLE IV

| Runs | Moles acid/ moles HP | Moles B₂O₃/ moles HP | Temp., °C. | Time, hrs. | Conversion percent | Selectivity percent |
|---|---|---|---|---|---|---|
| 1 | 2.0 | 1/3 | 20 | 4 | 95.7 | 87.7 |
| 2 | 2.0 | 1/3 | 40 | 4 | 95.7 | 78.4 |
| 3 | 2.0 | 1/3 | 60 | 3 | 96 | 26.4 |
| 4 | 4.0 | 1/3 | 20 | 6 | 95 | 95.1 |
| 5 | 2.0 | 2/3 | 20 | 4 | 96.0 | 79.2 |
| 6 | 2.0 | 1/6 | 20 | 4 | 72.0 | 94.4 |
| 7 | 4.0 | 1/3 | 20 | 4 | 94.8 | 91.5 |
| 8 | 4.0 | 1/3 | 20 | 4 | 96.0 | 84.8 |
| B | 4.0 | 1/3 | 20 | 4 | 15.7 | 69.4 |
| C | 4.0 | 1/3 | 20 | 4 | 19.7 | 27.1 |

Runs 1-3 of Table IV demonstrate the effect of temperature in this embodiment of the invention and clearly establish that the optimum temperature, in terms of yield, is below 60° C. Runs 4-6 demonstrate that variation in the levels of boron oxide dehydrating agent has little effect upon conversion or selectivity. The controls demonstrate the essentiality of using a strong acid catalyst, even though a weak mineral acid (boric acid) is present.

The foregoing description illustrates the methods of this invention whereby the advantages thereof are obtained. It will be understood that modifications and variations thereof may be effected by those skilled in the art without departing from the spirit of the invention. Accordingly, it is intended that all matter contained in the foregoing description shall be interpreted as illustrative and not in a limiting sense.

What is claimed is:

1. A process for the preparation of a perester of a carboxylic acid which process comprises reacting at a temperature from about 0° C. to about 100° C. (a) a monobasic acid selected from the group consisting of alkyl carboxylic acids having from 2 to 20 carbon atoms per molecule, hydrocarbyl aralkyl carboxylic acids having not more than 20 carbon atoms per molecule, hydrocarbyl alkaryl carboxylic acids of not more than 20 carbon atoms per molecule, and hydrocarbyl aromatic carboxylic acids of less than 20 carbon atoms per molecule with (b) an organic hydroperoxide of less than 15 carbon atoms per molecule selected from the group consisting of t-alkyl hydroperoxides, secondary hydrocarbyl aralkyl hydroperoxides and tertiary hydrocarbyl aralkyl hydroperoxides, said reaction being conducted in the liquid phase while removing water formed in the reaction with a less than fully hydrated boron oxide and said reaction being conducted in the presence of a catalytically effective amount of an acid which in dilute water solution at about 15–25° C. has a pK of less than about 3.5, the amount of strong acid not exceeding about 10% by weight of the total reactor charge, the molar ratio of carboxylic acid to organic hydroperoxide being at least 0.5:1.0.

2. A process in accordance with claim 1 wherein the less than fully hydrated boron oxide is selected from the group consisting of pyro-boric acid, meta-boric acid and $B_2O_3$ the amount of boron oxide being at least 0.1 mole per mole of hydroperoxide reactant.

3. A process in accordance with claim 2 wherein the amount of boron oxide added to the reaction medium is sufficient to provide a molar ratio of boron oxide to hydroperoxide which is at least about 0.3:1.

4. A process in accordance with claim 1 wherein the reaction is conducted in the presence of an inert liquid solvent selected from the group consisting of normally liquid paraffinic hydrocarbons, normally liquid cycloparaffinic hydrocarbons, aromatic hydrocarbons, ketones and ethers.

5. A process in accordance with claim 1 wherein the molar ratio of carboxylic acid to organic hydroperoxide is at least about 1:1.

6. A process in accordance with claim 1 wherein the organic hydroperoxide is a t-alkyl hydroperoxide selected from the group consisting of t-butyl hydroperoxide, t-amyl hydroperoxide, 2-methyl-2-pentyl hydroperoxide and 2,2,4-trimethyl-4-pentyl hydroperoxide.

7. A process in accordance with claim 6 wherein the organic hydroperoxide is t-butyl hydroperoxide.

8. A process in accordance with claim 1 wherein the carboxylic acid is selected from the group consisting of acetic acid, isobutyric acid, pivalic acid and benzoic acid.

9. A process for the preparation of t-butyl peracetate which process comprises reacting t-butyl hydroperoxide with acetic acid in the liquid phase in the presence of an inert solvent selected from the group consisting of aromatic hydrocarbons, normally liquid cycloparaffinic hydrocarbons, and normally liquid paraffinic hydrocarbons, said reaction being conducted in the liquid phase while removing water formed in the reaction with a less than fully hydrated boron oxide and said reaction being conducted in the presence of a strong acid in an amount from about 0.001% to about 10% by weight based on total reactor charge.

10. A process in accordance with claim 8 wherein the strong acid is sulphuric acid.

References Cited

UNITED STATES PATENTS

| | | | |
|---|---|---|---|
| 3,264,274 | 8/1966 | Leveskis | 260—453UX |
| 3,308,163 | 3/1967 | McKellin | 260—453UX |
| 3,444,230 | 5/1969 | Friedman et al. | 260—453 |

FOREIGN PATENTS

| | | | |
|---|---|---|---|
| 1,410,115 | 7/1965 | France | 260—453 |

OTHER REFERENCES

Parkes: Mellor's Modern Inorganic Chemistry, 1952, pp. 690 and 691.

Ephraim: Inorganic Chemistry, 1954, pp. 867 and 868.

Johnson et al: "Monobasic Carboxylic Acids" (1951).

Rodd: Chemistry of Carbon Compounds, vol. 1 (1951), pp. 537 & 593.

LEWIS GOTTS, Primary Examiner

G. HOLLRAH, Assistant Examiner